United States Patent [19]

Imbalzano et al.

[11] Patent Number: 4,743,658

[45] Date of Patent: May 10, 1988

[54] STABLE TETRAFLUOROETHYLENE COPOLYMERS

[75] Inventors: John F. Imbalzano, Elkton, Md.; Dewey L. Kerbow, Vienna, W. Va.

[73] Assignee: E. I. Du Pont de Nemours and Company, Wilmington, Del.

[21] Appl. No.: 789,893

[22] Filed: Oct. 21, 1985

[51] Int. Cl.$^4$ .......................... C08F 8/20; C08F 16/24
[52] U.S. Cl. .................. 525/326.4; 525/326.2; 525/355; 525/356; 526/247; 264/83
[58] Field of Search ................ 525/326.4, 326.2, 355, 525/356; 526/247; 264/83

[56] References Cited

U.S. PATENT DOCUMENTS

| | | | |
|---|---|---|---|
| 3,085,083 | 4/1963 | Schreyer | 525/326.2 |
| 3,354,135 | 11/1967 | Scarso et al. | 525/326.4 X |
| 4,294,943 | 10/1981 | Onoue et al. | 525/326.4 X |
| 4,499,249 | 2/1985 | Nakagawa et al. | 526/247 X |
| 4,599,386 | 7/1986 | Carlson et al. | 525/326.2 |
| 4,626,587 | 12/1986 | Morgan et al. | 528/481 |

FOREIGN PATENT DOCUMENTS

| | | | |
|---|---|---|---|
| 1210794 | 10/1970 | United Kingdom | 525/326.4 |
| 2167072 | 5/1986 | United Kingdom | 525/938 |

OTHER PUBLICATIONS

U.S. Ser. No. 752,174, filed Jun. 28, 1985, to Morgan & Sloan.
U.S. Ser. No. 608,862, filed May 10, 1984, to Buckmaster, Foss & Morgan.
U.S. Ser. No. 791,432, filed Oct. 25, 1985, to Buckmaster & Morgan.

*Primary Examiner*—Joseph L. Schofer
*Assistant Examiner*—F. M. Teskin

[57] ABSTRACT

A tetrafluoroethylene/perfluoro(alkyl vinyl)ether copolymer substantially free of unstable end groups and extractable fluoride that cause corrosion of metal surfaces.

5 Claims, No Drawings

STABLE TETRAFLUOROETHYLENE COPOLYMERS

FIELD OF THE INVENTION

The present invention relates to an improved perfluorinated resin, and in particular, to melt-fabricable tetrafluoroethylene (TFE)/perfluoro(alkyl vinyl)ether (PAVE) copolymers with stable polymer end groups.

BACKGROUND OF THE INVENTION

Tetrafluoroethylene/perfluoro(alkyl vinyl)ether (TFE/PAVE) melt-fabricable copolymers are widely employed in industrial injection molded goods and wire insulation applications. Their unique combination of chemical stability and high-temperature properties make them a preferred material for a wide range of injection molded parts, extruded pipe and tubing, and vessel liners.

TFE/PAVE resins are produced by aqueous polymerization (U.S. Pat. No. 3,635,926), or polymerization in a perhalogenated solvent (U.S. Pat. No. 3,642,742) or hybrid processes involving both aqueous and perhalogenated phases (European patent application No. 83104138.9). Free radical polymerization initiators and chain transfer agents are used in these polymerizations and have been widely discussed in the patent literature. For example, persulfate initiators and alkane chain transfer agents are described for aqueous polymerization of TFE/PAVE copolymers (U.S. Pat. No. 3,635,926). Fluorinated peroxide initiators and alcohols, halogenated alkanes, and fluorinated alcohols are described for nonaqueous (U.S. Pat. No. 3,642,742) or aqueous/nonaqueous hybrid polymerizations (European application No. 83 104138.9). The particular choices of initiator and chain transfer agent are dictated by the process conditions selected (temperature and reactant concentration) and the resin properties (viscosity and molecular weight distribution) desired.

The selections of the initiator and chain transfer agent dictate the end groups on the polymer chain. Persulfate initiators are known to give —COOH end groups in aqueous polymerization. If a polymerization buffer, such as an ammonium salt, is employed, —CO$_2$NH$_4$ end groups are obtained which convert to —CONH$_2$ ends during thermal conditioning. If methane is used as chain transfer agent, —CF$_2$H and —CF$_2$CH$_3$ ends will also be present in the resin.

In a nonaqueous polymerization (or aqueous/nonaqueous), peroxides such as (ClF$_2$C(CF$_2$)$_n$COO)$_2$ may be used as initiators, leading to —CF$_2$Cl end groups. If methanol is used as the chain transfer agent, —CF$_2$H and —CF$_2$CH$_2$OH end groups will also be present. In this type of polymerization, —COF end groups are also formed by unimolecular rearrangement of a PAVE radical on a growing chain, i.e.

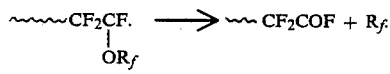

While the perfluorinated chains of the TFE/PAVE copolymers have extremely good thermal stability and chemical inertness, the end groups of the TFE/PAVE copolymers described above can be chemically reactive and thermally unstable.

SUMMARY OF THE INVENTION

It has now been discovered that these unstable end groups evolve HF, which is generated by the oxidation, hydrolysis and/or thermal decomposition of certain end groups, especially —COF, —CONH$_2$ and —CF$_2$CH$_2$OH. The HF generated from unstable end groups has been found to be similarly corrosive to metals, leading to metal fluoride corrosion products.

As a result of the discovery of the source of corrosivity, an improved TFE/PAVE resin was developed that does not contain the unstable end groups that have the corrosion potential described above. The improved resins have extremely low levels of corrosive extractable fluoride, in the form of dissolved HF or COF$_2$, and have nearly a quantitative absence of end groups that can oxidize, hydrolyze and/or thermally decompose to generate additional HF.

The present invention also includes a process for achieving the improved resins by contacting a TFE/PAVE resin having unstable end groups with fluorine gas under conditions sufficient to remove nearly all unstable end groups, and further, by reducing the extractable fluoride content to the required low level.

DESCRIPTION OF THE INVENTION

The tetrafluoroethylene/perfluoro(alkyl vinyl)ether copolymers that can be fluorinated by the process of this invention are ones that are made by any of the conventional processes described in the Background of the Invention section for making TFE/PAVE copolymers. The copolymers contain between 1 and 10 weight percent of recurring units derived from the vinyl ether, preferably 2 to 4 weight percent.

The comonomer content is low enough that the copolymers are plastics rather than elastomers, i.e., they are partially crystalline and do not exhibit a rapid retraction to original length from a stretched condition of 2× at room temperature. But the comonomer content is not so low that the copolymer is not melt fabricable.

By the term "melt-fabricable" is meant that the copolymer can be processed (i.e., fabricated into shaped articles such as injection molded articles, films, fibers, tubes, wire coatings and the like) by conventional melt-processing equipment. Such requires that the melt viscosity of the copolymer at the processing temperature be no more than 10$^7$ poise at 372° C. Preferably, it is in the range of 10$^4$ to 10$^6$ poise at 372° C.

Melt viscosities of the melt-processible polymers are measured according to American Society for Testing and Materials Method D-1238, modified as follows: The cylinder, orifice and piston tip are made of a corrosion-resistant alloy, such as Haynes Stellite (tm) 19 or Inconel (tm) 625. The 5.0 g sample is charged to the 9.53 mm inside diameter cylinder which is maintained at 372° C.±1° C. Five minutes after the sample is charged to the cylinder, it is extruded through a 2.10 mm diameter, 8.00 mm long square-edge orifice under a load (piston plus weight) of 5000 grams. This corresponds to a shear stress of 44.8 kPa. The melt viscosity in poises is calculated as 53170 divided by the observed extrusion rate in grams per minute.

The comonomers have the formula R$_f$—O—CF=CF$_2$ where R$_f$ is perfluoroalkyl of 1–8 carbon atoms. A preferred class is normal perfluoroalkyl. Specific copolymerizable comonomers include perfluoro(methyl vinyl ether), perfluoro(n-propyl vinyl ether), perfluoro(n-heptyl vinyl ether). Mixtures of these comonomers may be employed.

As-polymerized TFE/PAVE copolymer will contain at least about 80 end groups of —$CF_2CH_2OH$, —$CONH_2$ or —COF, per $10^6$ carbon atoms and during fabrication and/or subsequent heat treatment these unstable end groups can react or decompose to form HF which will result in an appreciable extractable fluoride content in the resin. Of course, in the process of this invention, any starting copolymer can be used regardless of the number of unstable endgroups, for whatever the number, upon fluorination, the number will be reduced. Depending on the method of polymerization, the starting copolymer may not contain any extractable fluoride, in which case, only the number of unstable endgroups will be decreased on fluorination and sparging.

The copolymer may contain minor amounts of at least one third comonomer, i.e, up to 5% by weight. Representative such copolymerizable comonomers are represented by the formula:

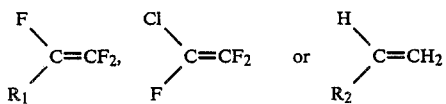

wherein $R_1$ is —$R_f$ or —$R_f X$ in which $R_f$ is a perfluoroalkyl radical of 1–12 carbon atoms, —$R_f$— is a perfluoroalkylene diradical of 1–12 carbon atoms in which the attaching valences are at each end of the chain, and X is H or Cl; and $R_2$ is —$R_f$ or —$R_f$—X. Specific such copolymerizable fluorinated ethylenically unsaturated comonomers include hexafluoropropylene, 3,3,3-trifluoropropylene-1, 3,3,4,4,5,5,6,6-nonafluorohexene-1.

The unstable end groups described above may be virtually eliminated by treatment of the polymer with fluorine. The fluorination may be carried out with a variety of fluorine radical generating compounds but preferably the polymer is contacted with fluorine gas. Since reactions with fluorine are very exothermic, it is preferred to dilute the fluorine with an inert gas such as nitrogen. The reaction conditions are interrelated. No one condition is critical, but the relation between them is important. If higher temperatures are used, shorter reaction times can be used, and vice versa. Similarly, if higher pressures are used, reaction temperatures and times can be reduced. With this in mind, the level of fluorine in the fluorine/inert gas mixture may be 1 to 100 volume % but is preferably 10–25% because it is more hazardous to work with pure fluorine. The temperature may be between 150° and 250° C., preferably 200°–250° C., and the fluorination time may be between 4 and 16 hours, preferably 8 and 12. It is preferred to agitate the polymer to expose new surfaces continuously. The gas pressure during fluorination may range from 1 atmosphere to 10 atmospheres absolute but preferably atmospheric pressure will be used. If a reactor is used at atmospheric pressure, it is convenient to pass the fluorine/inert gas mixture through the reactor continuously. The unstable ends are converted to —$CF_3$ ends.

Another means of expressing the combination of fluorine concentration and reaction time for the fluorination step is to define the amount of fluorine added per pound of polymer. The range of applicable values is 1.8 to 5.1 grams of fluorine per kilogram of polymer, with the desired range being 2.4 to 3.3 grams per kilogram. These values include the amount of fluorine to bring the reactor from 0.1 atmosphere to 1 atmosphere pressure at the beginning of the reaction.

Polymer subjected to fluorination may be any particulate form, such as powders, flake, pellets, cubes or beads. For convenience, particle size should not exceed 5 mm square or diameter.

After exposure of the polymer to fluorination for the desired length of time, the polymer is subjected to a flow of inert gas, i.e., inert to the copolymer, such as nitrogen, until the level of extractable fluorides is 3 ppm by weight or less. Generally, in this sparging step, the reaction vessel is preferably evacuated to 0.1 atmosphere before adding the inert sparge gas. Minimum time to complete sparging is defined by contacting, usually by bubbling, the effluent sparge gas with a starch/iodide solution or by passing it over starch/iodide paper. Lack of color development in the indicator indicates the absence of fluorine in the purge. Generally, 1–4 hours of sparging is adequate.

The fluorination and sparging conditions are such that after treatment, the copolymer will contain less than 6 end groups of —$CF_2CH_2OH$, —$CONH_2$ and —COF per $10^6$ carbon atoms in the polymer chain and will have an extractable fluoride content of 3 ppm or less by weight.

The —COF unstable end groups are the most resistant to conversion to stable —$CF_3$ groups of any of the end groups discussed in the Background section above; and if they are converted, it is certain that the others have been also.

The resulting copolymer exhibits low corrosivity toward metals.

TEST PROCEDURES

End Group Analysis

Thin films (0.25–0.30 mm) are molded at 350 degrees Centigrade using a heated platen press. The films are scanned on a Nicolet Model 5DX Fourier Transform infrared spectrometer. All operational settings used were those provided as default settings in the Nicolet control software, except for the number of scans collected before the transform is performed (40 scans vs. 10 scans in default mode).

Similarly, a film of a reference material known to have none of the end groups to be analyzed is molded and scanned. The reference absorbance spectrum is subtracted from the sample absorbance, using the interactive subtraction mode of the software. The —$CF_2$ overtone band at 4.25 micrometers is used to compensate for thickness differences between sample and reference during this interactive subtraction. The difference spectrum, in two ranges—5.13 to 5.88 micrometers (1950 to 1700 wavenumbers) and 2.70 to 3.45 micrometers (3700 to 2900 wavenumbers)—represents the absorbances due to reactive end groups.

Of primary interest to corrosivity are the acid fluoride end group and the carbinol end group, which are easily oxidized to produce HF and an acid fluoride end group. Calibration factors to allow calculation of end groups per million carbon atoms are determined from the absorbance of model compounds. The table below presents wavelengths and factors for determining end groups via the equation: ends/$10_6$ carbons=absorbance$\times$CF/film thickness in mm

| ENDGROUP | WAVELENGTH | CALIBRATION FACTOR (CF) |
|---|---|---|
| —COF | 5.31 micrometers | 440 |
| —CH$_2$OH | 2.75 micrometers | 2300 |
| —CONH$_2$ | 2.91 micrometers | 460 |

Perfluoropropylvinyl Ether (PPVE) Content Determination

The PPVE content in the melt-processible TFE/PPVE copolymers described herein is also determined by infrared spectroscopy. The ratio of absorbance at 10.07 micrometers to that at 4.25 micrometers is determined under a nitrogen atmosphere using films approximately 0.05 mm thick. The films are compression molded at 350° C., then immediately quenched in ice water. This absorbance ratio is then used to determine percent PPVE by means of a calibration curve established with reference films of known PPVE content. F19 NMR is used as the primary standard for calibrating the reference films.

Extractable Fluoride Content

Ten grams of sample to be tested (pellets, beads, flakes, etc) are placed in a polyethylene bottle. Ten milliliters of a 1:1 mixture (by volume) of methanol/water are added, and 10 mL of a Orion 94-09-09 Total Ionic Strength Adjusting Buffer (normally used in fluoride specific ion measurements) are added. The methanol portion of the mixture is necessary to speed the extraction. The mixture is agitated briefly and allowed to stand for 24 hours. Fluoride concentration is determined directly on the sample mixture, using an appropriately calibrated specific fluoride ion electrode (Orion 96-90-00). Calibration in the range of 0.05 to 50 micrograms fluoride per milliliter of extracting solution is appropriate to analyze concentrations in the range of 0.1 to 100 ppm by weight in the polymer sample.

STARCH/IODIDE TEST

Sparge gas is passed over a potassium iodide/starch paper (Fisher Scientific Co. paper was used). Lack of color on the paper indicates absence of fluorine in the gas.

EXAMPLES

The tetrafluoroethylene/perfluoropropyl vinyl ether copolymer (TFE/PAVE) used in these Examples was prepared generally in accordance with U.S. Pat. No. 3,642,742 (Carlson). This patent teaches a process for preparing TFE/PPVE copolymers in F-113 (1,1,2-trichloro-1,2,2-trifluoro ethane) solvent, with perfluoropropionyl peroxide initiator, and using methanol as a chain transfer agent.

EXAMPLE 1

Extrusion pelletized (average size, about 3 mm) tetrafluoroethylene/perfluoro(propyl vinyl)ether (PPVE) copolymer, 66.3 kg, of melt viscosity of $4.1 \times 10^4$ poise, and PPVE content of 3.4 weight % was charged into a double cone blender/reactor fluorination unit. Volume of the reactor was 425 liters. The blender and contents were purged with nitrogen and then evacuated to 0.1 atm pressure. The temperature was raised to 200° C., as measured by a thermocouple in the resin bed, and pressure was raised to 1.0 atmosphere pressure absolute by adding a 25 mole percent fluorine in nitrogen gas mixture. Flow of the gas mixture was continued for 8 hours at which time a total of 1480 gm of fluorine had been passed through the resin. The heat was then turned off and the vessel was evacuated to 0.1 atm. An atmospheric pressure nitrogen sparge was started and allowed to continue until the starch/iodide test was negative (about one hour). At that time, the temperature had cooled to 30° C., and the polymer was discharged.

The resulting sample was analyzed to have 0.8 ppm extractable fluorides and 5 acid fluoride end groups/million carbons and no detectable (less than 1) —CONH$_2$ or —CF$_2$—CH$_2$OH groups.

EXAMPLE 2

A 454 kg sample of a copolymer similar to the one used in Example 1 (MV=$4.9 \times 10^4$ poise, PPVE content=3 weight percent) was fluorinated as in Example 1 except the fluorine concentration in the fluorine/nitrogen gas was 10 mole percent, the reactor temperature was 200° C. and the reaction time was 15 hours. The resulting resin was analyzed to have 0.5 ppm extractable fluoride and less than 1 acid fluoride end group per million carbon atoms and no detectable —CONH$_2$ or —CF$_2$—CH$_2$OH groups.

COMPARISON A 1.36 kg of extruder-pelletized copolymer similar to the one used in Example 1 (MV=$3 \times 10^4$ poise, PPVE Content=3.1%) were treated in a 285°–290° C. air oven for 3 hours as above. The copolymer was not fluorinated. The resulting polymer was analyzed to contain 39 ppm extractable fluoride and 138 acid fluoride end groups per million carbon atoms.

EXAMPLE 3

A 49.5 kg sample of a copolymer similar to the one used in Example 1 (MV=$3.5 \times 10^4$ poise, and PPVE content was 3.4 weight %) was charged to a fluorinator (reactor volume=68.5 liters). The vessel and contents were sparged with nitrogen and heated to 210° C. The reactor was evacuated, then brought up to 1 atmosphere using a 10 mole percent mixture of fluorine in nitrogen. Flow of the mixture was established such that in 6 hours, a total of 247.5 grams of fluorine had been added to the vessel, including the original pressurization to 1 atmosphere. At the end of 6 hours, the fluorine mixture was turned off and a nitrogen purge begun. After 15 minutes sparging, the starch/iodide test was negative.

The resulting polymer was analyzed to have 5 acid fluoride end groups per million carbon atoms and no detectable —CONH$_2$ or —CF$_2$CH$_2$OH groups and 3 ppm extractable fluoride.

COMPARISON B

The copolymer used in this example was prepared in accordance with U.S. Pat. No. 3,635,926, which teaches a process for preparing TFE/PAVE copolymers using aqueous polymerization with ammonium persulfate initiator, ammonium carbonate buffer, ammonium perfluorooctanoate dispersing agent and ethane as chain transfer agent. Two 100 gm samples of a tetrafluoroethylene/perfluoropropyl vinyl ether (MV=$3.1 \times 10^4$ poise, PPVE Content=3.3%) containing 70 —CONH$_2$ end groups were fluorinated according to the conditions described in British Patent No. 1,210,794 (250° C. for 2 hours, 36 psig fluorine pressure). The resulting polymer showed 2 acid fluoride end groups per million carbon atoms, 10 ppm residual amide end groups, and more than 4000 ppm extractable fluoride.

We claim:

1. A melt-fabricable, nonelastomeric, copolymer of recurring units of tetrafluoroethylene, between about 1 and 10 weight percent units of at least one perfluoro(alkyl vinyl)ether where the alkyl group contains 1–8 carbon atoms, which can contain up to about 5 weight percent units of a comonomer selected from the formula

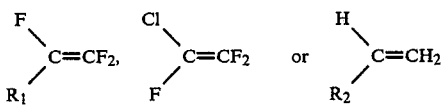

wherein $R_1$ is $-R_f$ or $-R_fX$ in which $R_f$ is a perfluoroalkyl radical of 1–12 carbon atoms, and X is H or Cl; and $R_2$ is $-R_f$ or $-R_f-X$, where $-R_f-$ is a perfluoroalkylene diradical of 1–12 carbon atoms in which the attaching valences are at each end of the chain, which copolymer is substantially free of end groups that can react or decompose to emit HF, said copolymer characterized by having (a) less than 6 endgroups of $-CF_2CH_2OH$, $-CONH_2$ and $-COF$ per $10^6$ carbon atoms and (b) an extractable fluoride level of 3 ppm or less by weight.

2. A process for removing unstable end groups and extractable fluoride content from a copolymer of recurring units of tetrafluoroethylene, between about 1 and 10 weight percent units of at least one perfluoro(alkyl vinyl)ether where the alkyl group contains 1–8 carbon atoms, which can contain up to about 5 weight percent units of a comonomer selected from the formula

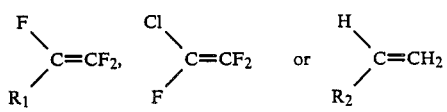

wherein $R_1$ is $-R_f$ or $-R_fX$ in which $R_f$ is a perfluoroalkyl radical of 1–12 carbon atoms, and X is H or Cl; and $R_2$ is $-R_f$ or $-R_f-X$, where $-R_f-$ is a perfluoroalkylene diradical of 1–12 carbon atoms in which the attaching valences are at each end of the chain, which copolymer contains more than 6 per $10^6$ carbon atoms of end groups of $-CF_2CH_2OH$, $-CONH_2$ and $-COF$, which comprises:

(a) contacting the copolymer with a fluorine-containing gas at a temperature, time and pressure sufficient to reduce the unstable end groups $-CF_2CH_2OH$, $-CONH_2$ and $-COF$ to less than 6 per $10^6$ carbon atoms, and (b) sparging the fluorinated copolymer with an inert gas until the level of extractable fluoride is 3 ppm or less by weight.

3. The copolymer of claim 1 wherein the perfluoro(alkyl vinyl)ether is a normal perfluoro(alkyl vinyl)ether.

4. The copolymer of claim 3 wherein the ether is perfluoro(propyl vinyl)ether.

5. The copolymer of claim 4 wherein the ether content is between 2 and 4 weight percent.

* * * * *